April 2, 1963     P. M. KNAPP     3,083,474
HIT INDICATOR APPARATUS
Filed March 6, 1961     5 Sheets-Sheet 1

PHILLIP M. KNAPP
INVENTOR.

BY THOMAS J. HOLDEN
DONALD M. SANDLER
ATTORNEYS

April 2, 1963  P. M. KNAPP  3,083,474
HIT INDICATOR APPARATUS
Filed March 6, 1961  5 Sheets-Sheet 2

PHILLIP M. KNAPP
INVENTOR.

BY THOMAS J. HOLDEN
DONALD M. SANDLER
ATTORNEYS

April 2, 1963

P. M. KNAPP 3,083,474

HIT INDICATOR APPARATUS

Filed March 6, 1961

PHILLIP M. KNAPP
INVENTOR.

BY THOMAS J. HOLDEN
DONALD M. SANDLER
ATTORNEYS

April 2, 1963     P. M. KNAPP     3,083,474
HIT INDICATOR APPARATUS Filed March 6, 1961     5 Sheets-Sheet 5

PHILLIP M. KNAPP
INVENTOR.

BY THOMAS J HOLDEN
DONALD M. SANDLER
ATTORNEYS

United States Patent Office 3,083,474
Patented Apr. 2, 1963

3,083,474
HIT INDICATOR APPARATUS
Phillip M. Knapp, Timonium, Md., assignor to Aircraft Armaments, Inc., Cockeysville, Md., a corporation of Maryland
Filed Mar. 6, 1961, Ser. No. 93,756
17 Claims. (Cl. 35—25)

This invention relates to hit indicator apparatus of the type utilizing an optical link to connect a target with a weapon, and more particularly to improved apparatus by which the optical link is capable of correlating weapon superelevation and target size with target range.

Hit indicator apparatus of the class described is disclosed in co-pending application Serial No. 73,777, filed December 5, 1960. Briefly, an RF link connects a gunner to a target when the gunner fires his weapon in a conventional manner, and triggers an IR source mounted on the target. An optical link connects the target with the gunner only if the IR source is within the field of view of a photoelectric telescope attached to the weapon. If the optical link exists, the RF link indicates to the target that a hit has been scored.

Apparatus of the class described permits tactical field training of personnel using direct fire weapons to be conducted on a realistic basis. However, inherent characteristics of such apparatus raise certain problems that will become apparent from a consideration of an actual situation wherein a gunner is to fire a ballistic projectile to strike a target. In such situation, a gunner must superelevate his weapon in accordance with target range, and line up the target in his sight so that the target is intersected by the projectile trajectory. Both precise aim and correct superelevation of the weapon are required if a gunner is to hit a target with a projectile. Unfortunately, apparatus of the class described requires neither precise aim nor weapon superelevation.

The problem outlined above is made clear by considering the fact that the field of view of the photoelectric telescope, or the area visible to the photocell, increases with range. Thus, if a target has a certain area, it might occupy the whole field of view at close range requiring the gunner to aim directly at the target in order to secure a hit. At a remote range, the area of the target occupies an extremely small portion of the field of view. Considerable variation in the location of the aim point of the weapon is tolerated before the IR source moves out of the field of view.

It is, therefore, an object of this invention to provide apparatus of the class described wherein the optical link requires a gunner, in order to score a hit, to superelevate his weapon in accordance with the ballistic characteristics thereof, and to aim at the target with a precision approaching that required to hit the target were a projectile actually fired. It is a further object of this invention to provide apparatus of the class described capable of providing information as to whether the gunner aimed too high or too low at the target to score a hit.

As a feature of this invention whereby the objects thereof are achieved, the shape and light transmission characteristics of a field stop of the photoelectric telescope requires the gunner to properly superelevate his weapon and aim at a vulnerable area of the target in order to bring the IR source into the field of view of the photocell. Given a target with a predetermined vulnerable area, e.g., an area in which a hit by a projectile would be a kill; and a weapon having predetermined ballistic characteristics relating superelevation to target range, the shape of the field stop is the envelope of the projection on the field stop screen of said vulnerable area of the target as the latter is moved from some minimum range to the maximum range of the weapon taking into account the required change in superelevation of the weapon as the target range changes. A filter over the field stop is graduated from clear at the portion of the envelope representing the vulnerable area at maximum range to dense at the portion of the envelope representing the vulnerable area at minimum range. The density gradient is set up so that equi-density lines correspond to the projections of a portion of the boundary of said vulnerable area as the target is moved between minimum and maximum ranges. The gradient is such that the transmissivity at a given equi-density line is made to be inversely proportional to the intensity of IR radiation reaching said last-mentioned line from an IR source of fixed intensity located at a range determined by the position of the given line. With this arrangement, when the aim point of the weapon (namely the intersection of the optical axis of the telescope with the line of sight through the weapon sight system) lines in the vulnerable area of the target, the photocell has an output which lies between minimum and maximum values. An output below the minimum value indicates a low miss on the target while an output above the maximum value indicates a high miss. Level and sensitivity adjustments in the circuitry accompanying the photocell permits detection of these too-low and too-high outputs, thereby detecting low and high misses in addition to hits.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

Figure 1:
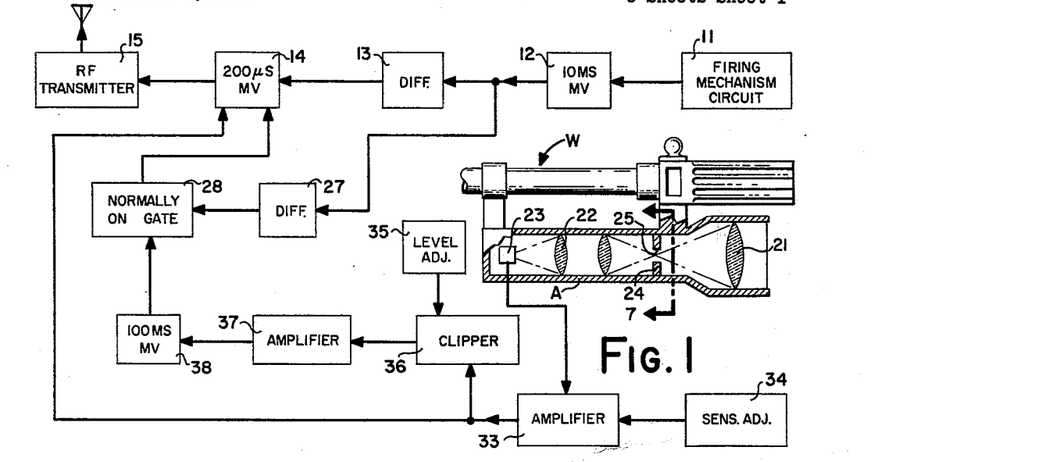
FIGURE 1 shows the circuit diagram of the RF and optical equipment at a weapon for hit indicator apparatus of the class described.
Figure 2:
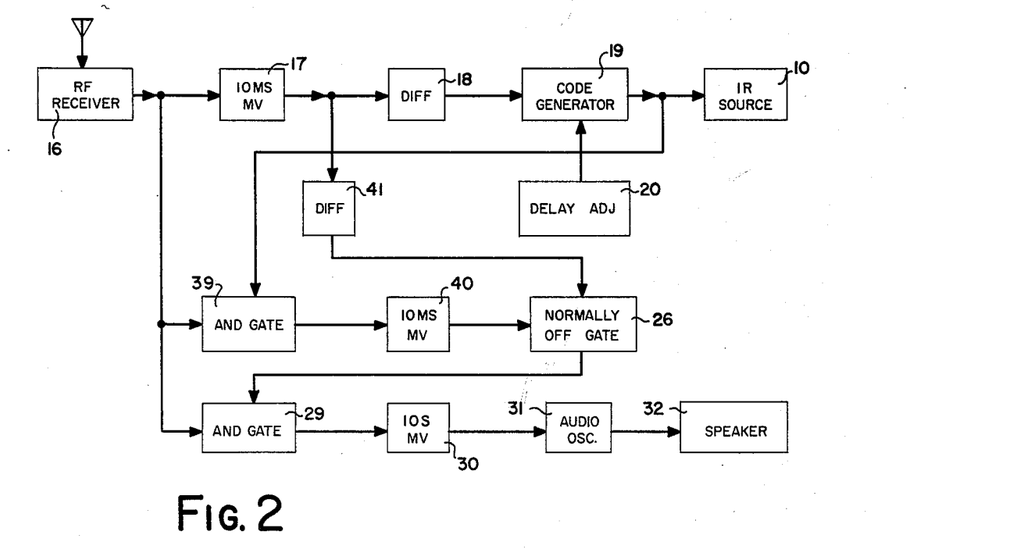
FIGURE 2 shows the circuit diagram of the RF and optical equipment at a target.

The operation of hit indicator apparatus of the class described can be understood by referring to FIGURES 1 and 2. Direct fire weapon W has photoelectric telescope A rigidly attached adjacent the muzzle. Assume that the gunner has aimed the weapon such that the optical axis intersects IR source 10 mounted on the target, and then pulls the weapon trigger (not shown). Movement of the firing mechanism (not shown) is sensed in a conventional manner. This is represented by firing mechanism circuit 11 which produces a pulse when the trigger is pulled, that causes MV 12 to produce a pulse of 10 ms. duration. This pulse is differentiated at 13 so that its leading edge triggers MV 14 producing a 200 μs. pulse that causes RF transmitter 15 to broadcast a 200 μs. RF interrogation signal omnidirectionally from the antenna. At the target, the RF interrogation signal is detected at receiver 16 causing MV 17 to produce a 10 ms. pulse coincident in time with the pulse produced at the weapon by MV 12. The output of MV 17 is differentiated at 18 so that the leading edge of the 10 ms. pulse enters code generator 19. Depending upon the setting of delay adjustment 20, the output of generator 19 pulses IR source 10 within the 10 ms. pulse interval. Light from source 10 is collected by lens 21 and is focused by collimating lenses 22 on transducer 23 which may be a phototransistor or the like. Field stop 25 in screen 24 limits the field of view of telescope A.

The output of transducer 23 is amplified and is applied to MV 14 which causes transmitter 15 to send an RF verification pulse. This is received at the target coincident in time with the output of generator 19. Since these signals are coincident in time, "and" gate 39 produces an output which is applied to MV 40. The output of MV 40 is a 10 ms. pulse which serves to open normally off gate 26 during the time of occurrence of the trailing edges of the 10 ms. pulses out of MV's 12 and 17. The pulse out of MV 12 is differentiated at 27 so that a pulse at the trailing edge passes through normally "on" gate 28 causing MV 14 to pulse RF transmitter 15 producing an RF termination pulse. The pulse out of MV 17 is differentiated at 41 so that a pulse at the trailing edge passes through gate 26 (opened as above described) and appears at "and" gate 29. The RF termination pulse is detected at receiver 16 and appears at gate 29 simultaneously with the pulse out of gate 26. As a result, there is an input to MV 30 which in turn produces a 10 second pulse. Audio oscillator 31 is thus operable for 10 seconds producing a 10 second tone from speaker 32.

If the gunner is not aiming at the target when he fires, there is no RF verification pulse following the RF interrogation pulse. Thus, at gate 39, only the output of generator 19 appears and gate 26 remains closed; and at gate 29 only the output of receiver 16 (coincident in time with the RF termination pulse) appears. In this case, there is no output from speaker 32.

If the gunner is aiming at the target but the range is greater than that of the weapon, the signal level of transducer 23 will be below the sensitivity of amplifier 33 and no RF verification pulse is transmitted. Sensitivity adjustment 34 permits the maximum range of the weapon to be selected.

If the output of transducer 23 is such that it exceeds a maximum value determined by level adjustment 35 of clipper 36, the latter produces an output which is amplified at 37 and applied to MV 38. The result is a 100 ms. pulse which closes gate 28 preventing the transmission of an RF termination pulse.

From the above, it is seen that in order to indicate a hit, (1) the transmitter at the weapon must transmit an RF interrogation pulse, an RF verification pulse, and an RF termination pulse; and (2) the RF verification pulse must be coincident in time with the IR pulse. Any situation which prevents transmission of an RF pulse prevents operation of indicator 32.

Figure 3:
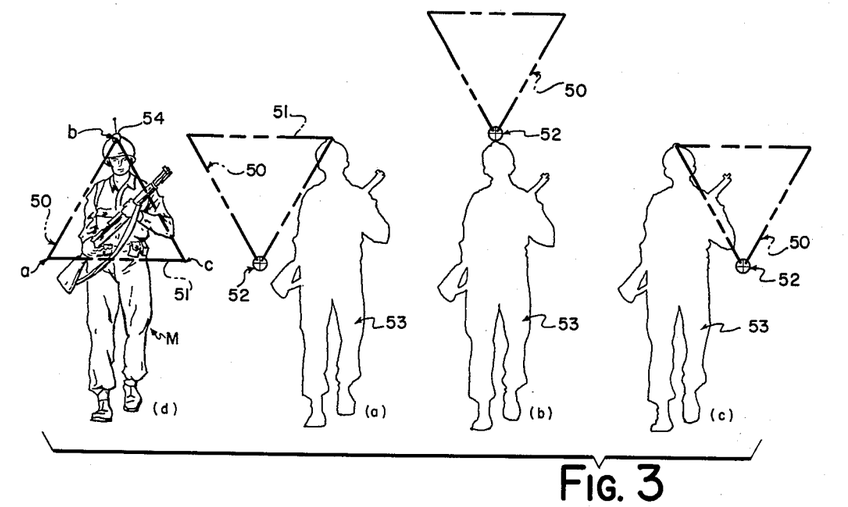
FIGURES 3(a), 3(b), and 3(c) are the silhouettes of a running man as projected on the field stop screen of a telescope showing various aim points.
FIGURE 3(d) shows the vulnerable area of a running man whose silhouette is shown in the other portions of FIGURE 3.

Reference is now made to the various parts of FIGURE 3. Assume that the plane of the drawing represents the field stop screen of a photoelectric telescope, and that in FIGURES 3(a), 3(b), and 3(c), inverted triangle 50 is the field stop. Triangle 50 is isosceles with base 51 being equal to the height of apex 52 from base 51. Further, assume that the telescope is rigidly mounted on a weapon having a sighting system such that the optical axis of the telescope intersects the line of sight through the sighting system at apex 52 of stop 50. If silhouette 53 represents the projection on the screen of a target in the form of a man M at a given range, it is apparent that the field of view of the telescope at such range is an inverted triangle whose base and height are approximately half the height of the man.

Let 54 represent an IR source mounted on the helmet of the target. Then, if, as in FIGURE 3(a), the weapon is aimed at the point a corresponding to a point about waist high and just below the right elbow, the upper right vertex of triangle 50 just includes source 54; if, as in FIGURE 3(b), the weapon is aimed at the point b corresponding to source 54, the latter is included in apex 52; and if, as in FIGURE 3(c), the weapon is aimed at point c corresponding to a point about waist high and just below the right elbow, the upper left vertex of triangle 50 just includes source 54. However, if the weapon is aimed at any point outside of the triangle a, b, c of FIGURE 3(d), the field of view defined by triangle 50 will not include source 54. Thus, triangle a, b, c represents the area on the target within which the aim point must lie in order for IR source 54 to be in the field of view. This is the so-called vulnerable area of target M.

Figure 4:
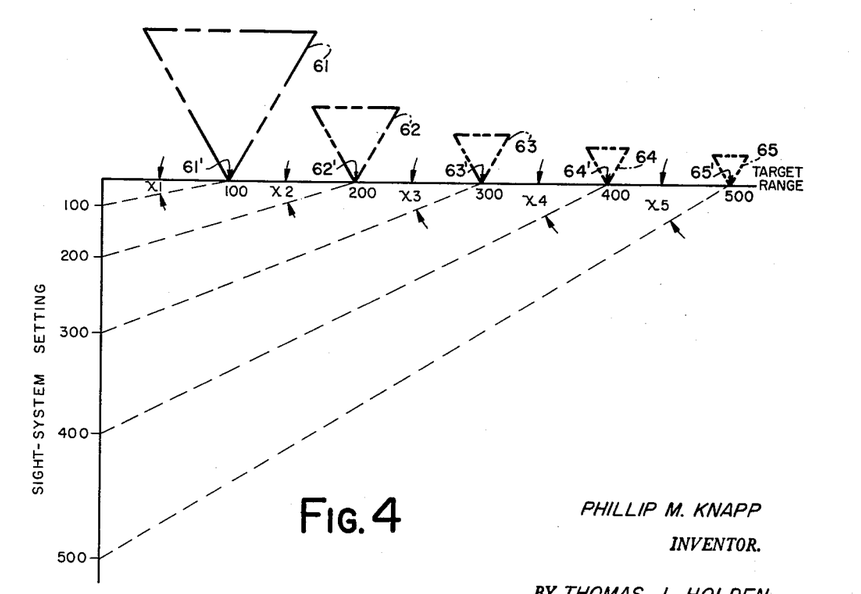
FIGURE 4 is a chart which shows the variation in size of the projection on a field stop screen of a telescope of a triangular target area as the range of the latter is varied, and the variation in weapon superelevation as a function of target range.

To scale, the vulnerable area is an erect isosceles triangle whose apex is at source 54, whose height is about 3 feet, and whose base is about 3 feet. This vulnerable area is fixed regardless of target range. However, to an observer, this fixed area would appear to decrease in size as the range of the target increases. This is illustrated in FIGURE 4 which shows how, to an observer, the size of a target decreases as the target range increases from, say, 100 yards to 500 yards. The decrease in size is inversely proportional to the increase in range. In other words, the size of the target at 200 yards is half the size of the same target at 100 yards.

Referring now to FIGURE 4, let triangle 61 represent the size of a field stop in the field stop screen of a telescope necessary to limit the field of view of the telescope to an inverted isosceles triangle having a 3-foot base and a 3-foot height a distance of 100 yards from the screen. In other words, triangle 61 is the projection of this inverted triangle on the field stop screen. From the above discussion, this field stop defines the desired vulnerable target area (an inversion of the triangle at 100 yards). Further, let triangles 62, 63, 64, and 65 represent the sizes of field stops necessary to limit the field of view to the isosceles triangle at positions of 200 yards, 300 yards, 400 yards, and 500 yards, respectively. In FIGURE 4, triangles 61–65 are equally spaced to represent increments of range from 100 to 500 yards from the observer. Triangle 62, representing the field stop size necessary to limit the field of view to the fixed isosceles triangle at 200 yards, is half the size of triangle 61, etc.

FIGURE 4 illustrates how, with a given weapon having certain ballistic characteristics controlling superelevation as a function of target range, the field stop size and the superelevation angle varies with target range from 100 to 500 yards in increments of 100 yards. The superelevation angles are shown at each increment to be $x_1$, $x_2$, $x_3$, $x_4$, and $x_5$, respectively.

Figures 5, 6, 7:
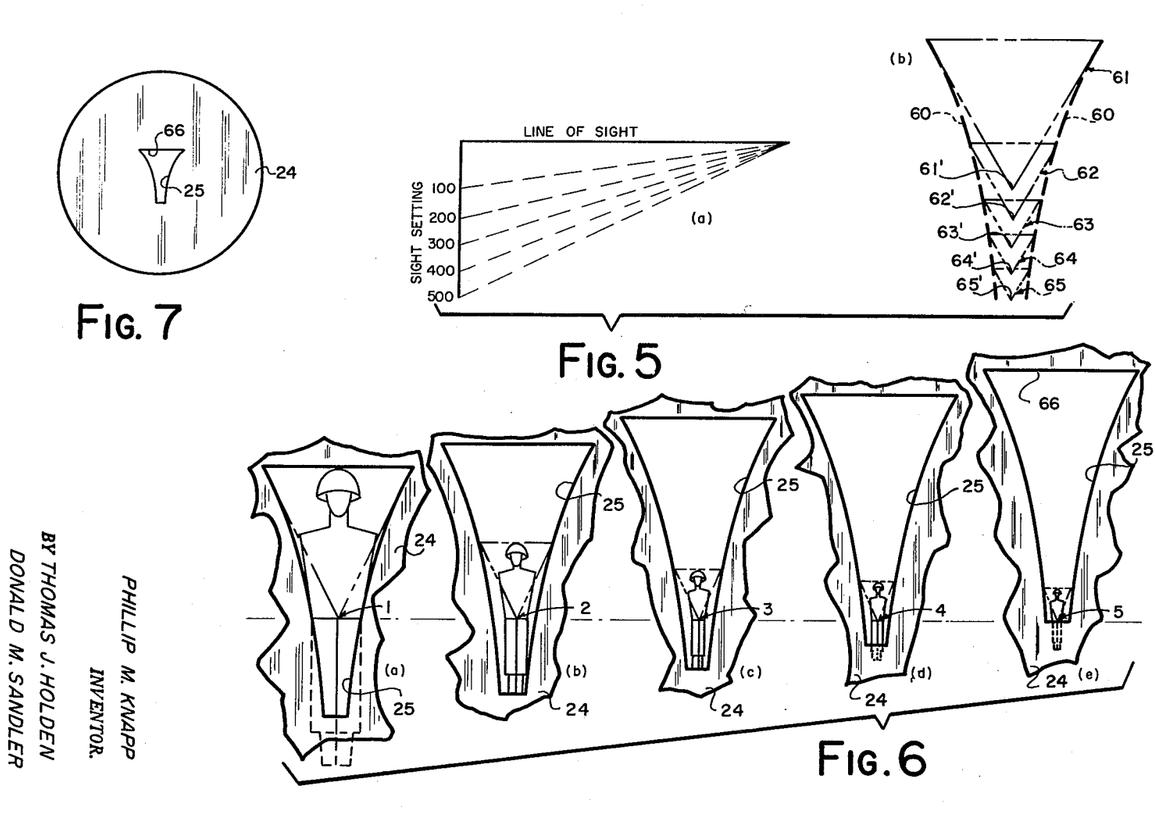
FIGURE 5 shows how weapon superelevation causes the envelope of the projections on the field stop screen of a fixed sized triangular target area to become elongated.
FIGURE 6 shows how a weapon must be superelevated as a target range increases while the aim point on the target is maintained.
FIGURE 7 is a typical field stop screen showing a stop therein made in accordance with the principles set forth in this specification.

Recalling that the line of sight through the sight system of the weapon must intersect the optical axis of the telescope at apexes 61', 62', 63', 64', and 65' of triangles 61, 62, 63, 64, and 65, FIGURE 5 illustrates the relative vertical positions of the field stops to bring about the proper superelevation-range relationship. As above described, triangles 61–65 represent the projection on the field stop screen of inverted triangles of fixed size as the distances from the screen to the triangle varies from 100 to 500 yards in 100-yard increments and the superelevation of the weapon is properly related to the range of the triangles. Since the target can take any range between the incremental positions shown, dotted lines 60 represent the envelope of the projection, on the screen, of the triangle as the latter is moved from 100 to 500 yards and the superelevation is properly correlated with range. This envelope defines the shape of the field stop 25 for the telescope. To illustrate proper aiming, reference is made to FIGURE 6 wherein the mannequin size represents the size of the target as it would appear to an observer at ranges of 100 to 500 yards, in 100-yard increments. In each case, the observer is aiming at the midsection of the target, and FIGURE 6 illustrates how the weapon must be superelevated in order to maintain the aim point at the midsection of the target as the latter is placed at various ranges. However, it should be apparent that with a field stop 25 of the shape shown in FIGURE 7 and of the size dictated from consideration of the above factors, the actual vulnerable area of the target varies considerably in excess of the desired vulnerable area. Consider FIGURE 6(e) as illustrative. With correct setting of the sight system of the weapon, the aim point at 500 yards is at 5. Because the field stop is very much larger than is necessary for a target at 500 yards, aim point 5 could be lowered (the weapon depressed) until the IR source on mannequin is just below top edge 66 of field stop 55, and a hit would still be indicated since the IR source would be within the field of view of the transducer. To understand how the invention precludes this, reference is made to FIGURE 8.

Figure 8:
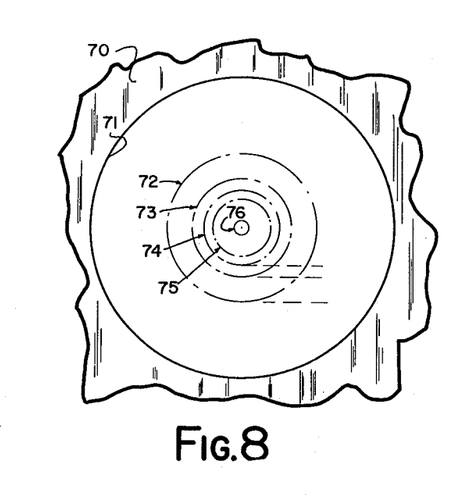
FIGURE 8 is a field stop screen having a stop therein for a circular target and a weapon having a flat ballistic trajectory.

FIGURE 8 shows a field stop screen 70 having circular field stop 71, which is the projection on screen 70 of a target circle six feet in diameter located 100 yards from the screen. Circle 72 is the projection of the target circle when the latter is at 200 yards. Circle 72 is then one-half the diameter of stop 71. Thus, stop 71 represents the envelope of the projections on the screen of the target circle as the latter is moved from 100 to 500 yards assuming that the optical axis of the telescope is collinear with the line traced by the center of the target circle as it is moved. The projections of the target circles at 300, 400, and 500 yards are shown at 73, 74, and 75, respectively. No consideration is given to superelevation to correlate the same with range.

Consider that a source of radiation 76 is located at the center of the target circle. If such source of radiation has a fixed intensity, and the target circle were positioned at 500 yards, the intensity of radiation reaching the screen would be proportional to the factor $(1/500)^2$. If the same source were positioned at 100 yards, the intensity would be proportional to $(1/100)^2$. Thus, the intensity reaching the screen when the source is at 100 yards is 25 times as great as when the source is at 500 yards; at 200 yards, 6.25 times as great; at 300 yards, 2.78 times as great; and at 400 yards, 1.56 times as great.

Figure 9:
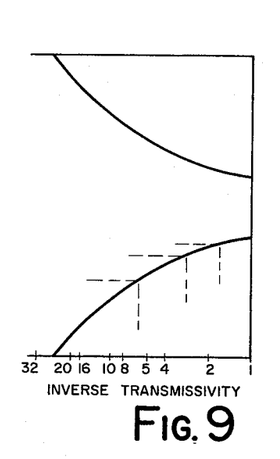
FIGURE 9 is a graph showing the variation in density of a filter placed over the stop of FIGURE 8 plotted as inverse transmissivity as a function of diametral position.
Figure 10:
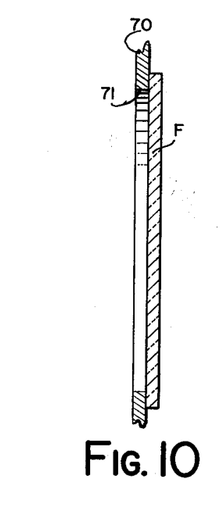
FIGURE 10 shows a filter having the characteristics shown in FIGURE 9 placed over the stop of FIGURE 8.

Filter F over field stop 71 is graduated from clear at circle 75 (the portion of the envelope representing the target area at maximum range) to dense at the edge of stop 71 (the portion of the envelope representing the target area at minimum range). The density gradient is set up so that equi-density lines are concentric circles which correspond to the boundary of the target area as the latter is moved between minimum and maximum range. The density along any equi-density line in the filter is such that the transmissivity of radiation on the equi-density line is inversely proportional to the intensity of radiation that would reach that line from a source located at a range determined by the position of the line on the stop. Thus, at the edge of stop 71, the transmissivity is 1/25; at circle 72, 1/6.25; at circle 73, 1/2.78; at 74, 1/1.56; and at 75, 1. The values of the inverse transmissivity as a function of diametral position is shown in FIGURE 9. The optical axis of a telescope in which screen 70 is the field stop screen passes through the center of circle 71. Suppose now that the radiation source at 500 yards from the telescope causes the phototransducer to produce an output of $x$ volts if the optical axis intersects the source. A shift of the intersection point anywhere within the target circle would not change the output because the clear portion of the filter covers the projection of the target circle on the filter. Suppose the target circle is moved to 200 yards. The projection of the target circle is circle 72. The intersection of the optical axis with any point of the target circle within the projection thereon of circle 75 causes the transducer output to be $(500/200)^2$ $x$ volts, or 6.25 $x$ volts. As the intersection point approaches the periphery of the target circle, the output of the transducer approaches $x$ volts. If the optical axis is tilted so that it does not intersect the target circle, radiation from source 76 passes through a portion of the filter which attenuates the radiation to such a degree that the transducer output is reduced below $x$ volts. Therefore, any output of the transducer in excess of $x$ volts would indicate that the optical axis of the telescope intersects the target circle, regardless of the range of the target circle.

Figure 11:
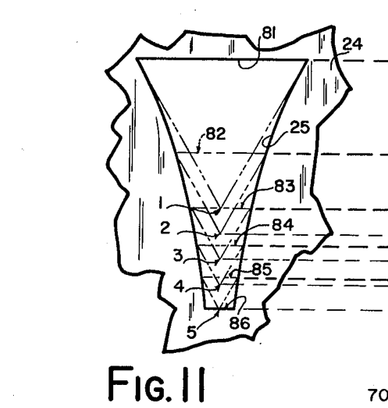
FIGURE 11 is a field stop for a weapon having typical ballistic characteristics and a target similar to that of FIGURE 3(d).
Figure 12:
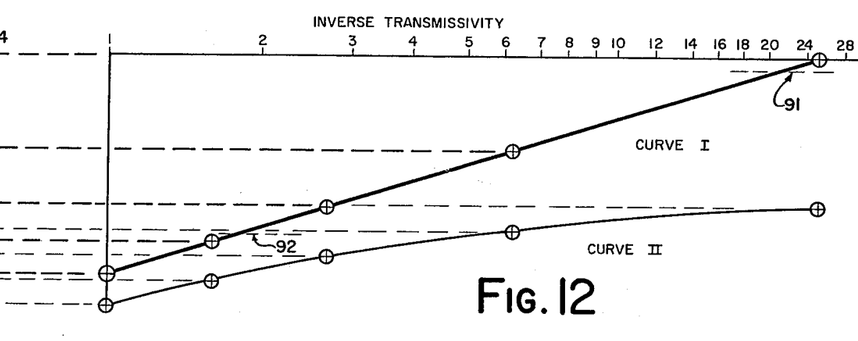
FIGURE 12 is a graph showing the density of a filter for the field stop of FIGURE 11.

The above-described principles are applied to stop 24 as shown in FIGURE 11 by constituting screen 25 as an opaque film having a properly formed density gradient applied in the region of stop 24. Recalling that stop 24 is the envelope of the projection of an inverted triangular area as the latter is moved in range taking the ballistic properties of a weapon into account, it is apparent that the result is a target area that degenerates to a generally trapezoidal figure having parallel bases. At 100 yards, the larger of the two bases of the trapezoidal figure defines the top edge 81 of stop 24 while at 500 yards, the larger of the bases defines line 85 of stop 24. Here then, equi-density lines are horizontal lines representing projections of the larger base of the trapezoidal target figure as the target varies between minimum and maximum range. From line 85 to bottom edge of stop 24, the density is zero, giving a transmissivity of 1. At line 85, the inverse transmissivity increases until at line 84, corresponding to the larger base of the target figure at 400 yards, the value is 1.56; at line 83, corresponding to the larger base at 300 yards, the value is 2.78; at line 82, corresponding to the larger base at 200 yards, the value is 6.25; and at line 81, corresponding to the larger base at 100 yards, the value is 25. This is shown as Curve I in FIGURE 12. Curve II represents the variation of inverse transmissivity as a function of displacement along the vertical symmetry axis of stop 24 starting at the lower base of the target figure at 500 yards and ending at the lower base of the figure at 100 yards. The inverse transmissivity from line 83 (which only by coincidence happens to be both the projection of the lower base of the target figure at 100 yards as well as the upper base of the figure at 200 yards) to edge 81 is constant at 25.

A field stop having a Curve I filter is utilized in the apparatus shown in FIGURES 1 and 2. If a source of IR radiation is at 500 yards and the weapon is oriented so that the source is between line 85 and bottom edge 86 of stop 24, the output of transducer 23 will be some value, say $y$ volts. If the orientation of the weapon is changed so that the source is anywhere above line 85, the output will be less than $y$ volts. Sensitivity adjustment 34 prevents amplifier 33 from producing an output wherever the gunner orients the weapon such that a source at 500 yards lies outside the trapezoidal figure bounded by lines 85, 86. Since the intersection of the line of sight through the weapon sight system for a target at 500 yards intersects the optical axis of the telescope at the center of line 86, (point 5) the gunner will score a hit whenever he aims at a trapezoidal area on the target that is the inverse of the area bounded by the lines 85, 86.

If the target is moved to 100 yards, the intensity of radiation reaching the screen of the field stop will be 25 times greater than when the target was at 500 yards. If the weapon is oriented so that the source lies between equi-density lines 83, 81, the output of transducer 23 will vary from 9 $y$ volts to $y$ volts. Adjustment 35 is set to cause clipper 36 to produce an output when the output of amplifier 33 exceeds 9 $y$ volts. Thus, the hit indicator apparatus will not function to indicate a hit if the gunner has oriented the weapon such that the source lies in the trapezoidal figure bounded by lines 83, 86. Since the intersection of the line of sight through the weapon sight system for a target at 100 yards intersects the optical axis of the telescope at the center of line 83 (point 1) the gunner will score a hit whenever he aims at a trapezoidal area on the target that is the inverse of the area bounded by the lines 81, 83.

Figure 13:
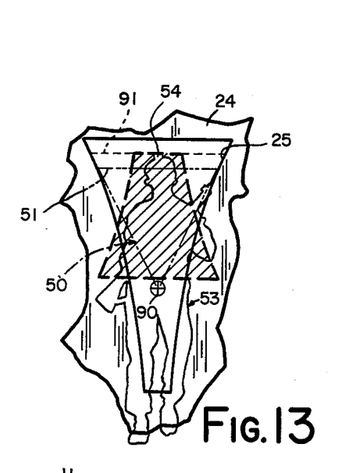
FIGURES 13 and 14 show the relationship between the projection of a target on the field stop screen when the gunner has improperly aimed.
Figure 14:
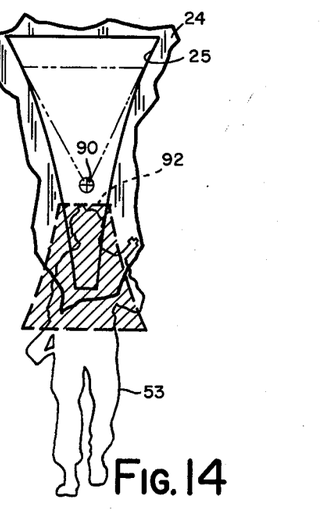

To illustrate, suppose a target were at 125 yards. In FIGURES 13 and 14, silhouette 53 represents the projection of a target at 125 yards on screen 24, the vertical position of the target relative to stop 25 being a function of gunner's aim. At 125 yards, the intensity of radiation from source 54 reaching the screen 24 will be $(500/125)^2$ or 16 times greater than if the target were at 500 yards. Source 54 lies on equi-density line 91 which from Curve I attenuates the intensity by a factor of about 21 to 1. The output of amplifier 33 is therefore 16/21 $y$ volts. Since this is less than $y$ volts, there is no output from amplifier 33 and no hit is indicated. However, the presence of a signal out of the transducer less than the threshold value indicates a miss. From a consideration of FIGURE 13, it can be seen that the miss is low. Point 90 represents, for a target at 125 yards, the intersection of the line of sight through the sight system of the weapon with the optical axis of the telescope. Until point 90 is moved upwardly to the shaded region, a low miss would occur.

Now suppose that the gunner has aimed the weapon such that point 90 is above the head of silhouette 53. In such a case, source 54 lies on equi-density line 92, which, from Curve I, attenuates the intensity by a factor of about 1.7 to 1. The output of amplifier 33 is therefore 16/1.7 $y$ volts or 9.4 $y$ volts. Since this exceeds the level at which adjustment 35 is set, clipper 36 produces an output which acts to turn off gate 28 and to prevent transmission of an RF termination pulse. Thus, a hit is not indicated. Moreover, the presence of the 100 ms. pulse from MV 38 indicates that a miss has occurred and that the miss is "high."

The above-described system works well enough but with weapons whose ballistic characteristics are such that the stop envelope becomes elongated more than indicated, it happens that at ranges between minimum and maximum values, the actual vulnerable area within which a hit will be indicated is somewhat larger than the desired area. This arises because the gradient of the density of the filter is correct only for the lower boundary of the vulnerable area of the triangle. That is, the lower boundary of the projection on the screen of the desired target configuration for a given range has a transmissivity dependent upon the upper boundary of the configuration at some other range which coincides with the first-mentioned lower boundary. For example, consider the 400-yard trapezoid whose base is at 84 in FIGURE 11. At 400 yards, the intensity of radiation reaching the filter is greater than if the target were at 500 yards by the factor 25/16. If the aim were such that IR source fell on line 84 (aim point is waist high), the output of the transducer would be $(25/16)(1/1.56)$ $y$ volts, or simply $y$ volts. If the aim were such that IR source fell between point 4 and edge 86, the transmissivity of the filter is 1, and the output of the transducer would be 1.56 $y$ volts. Since this is well below the level at which adjustment 35 is set, a hit will be indicated when the aim is about 2 feet (at 400 yards) over the IR source on the target.

Figure 15:
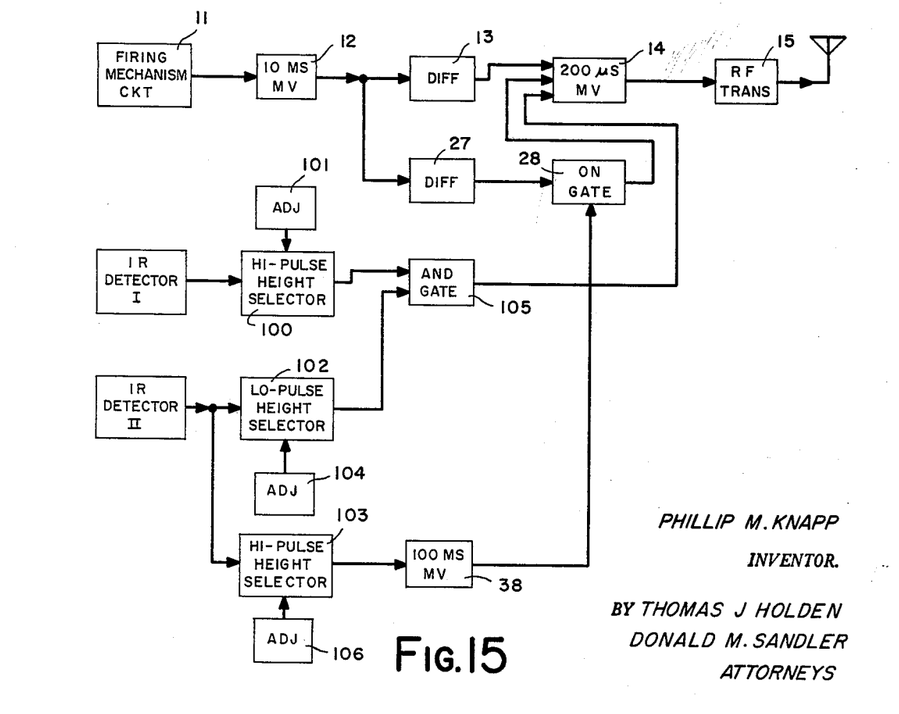
FIGURE 15 is a modification of the equipment of FIGURE 1 whereby high and low misses can be detected.

The construction of FIGURE 15 can be utilized to make the actual vulnerable target area independent of target range. Components 11, 12, 13, 14, 27, and 28 operate exactly as described in FIGURE 1 previously. However, the weapon is fitted with two IR detectors, each of which is similar to the detector described in FIGURE 1. However, detector I is fitted with a Curve I filter and detector II with a Curve II filter. The output of the transducer of detector I after suitable amplification is applied to height selector 100. Adjustment 101 of selector 100 is set so that an output from height selector 100 occurs only when the output of detector I exceeds the threshold voltage determined by the voltage achieved with a target at maximum range, and the IR source seen through the clear portion of the filter. In the previously described embodiment, this was called $y$ volts. The output of the transducer of detector II after suitable amplification is applied to height selectors 102 and 103. Adjustment 104 of selector 102 is set so that an output occurs only when the output of detector II is less than the threshold voltage. The outputs of selectors 100 and 102 are applied to "and" gate 105 so that MV 14 can be actuated by an IR answer signal only when the point of aim is correct for the target range. Detector I and selector 100 produce an output when the aim point is above the lower boundary of the target area thus preventing a low aim from scoring a hit. Detector II and selector 102 produce an output when the aim point is below the upper boundary of the target area thus preventing a high aim from scoring a hit. Unless the aim point lies between the upper and lower boundaries, gate 105 will not operate.

To prevent transmission of an RF termination pulse when the aim is too high, adjustment 106 is set so that an output from selector 103 occurs only when the output of detector II is more than the threshold voltage. Such output turns on MV 38 which closes gate 28 and prevents the trailing edge of the 10 ms. pulse out of MV 12 from pulsing transmitter 15.

What is claimed is:

1. A hit detector system comprising a target having a predetermined area, a selectively operable source of radiant energy on said area, a weapon whose angle of elevation is a function of target range, said weapon having an actuatable trigger, a telescope rigidly mounted on said weapon, a detector responsive to said radiant energy, said detector being located at the eyepiece of the telescope, a field stop screen in said telescope, said screen having an aperture therein, said aperture defining the envelope of the projection on the field stop screen of said area as the range of the target changes between maximum and minimum values and the elevation of said weapon is changed to match the target range, and means to selectively operate said source of energy when said trigger is actuated.

2. A hit detector system comprising a target having a predetermined area, a selectively operable source of radiant energy on said area, a weapon whose angle of elevation is a function of target range, said weapon having an actuatable trigger, a telescope rigidly mounted on said weapon, a detector responsive to said radiant energy, said detector being placed in said telescope so that a source of said radiant energy in the field of view of the telescope is detectable by said detector, a screen having a field stop for limiting the field of view of said telescope, said field stop defining the envelope of the projection on said screen of said area as the range of the target varies between maximum and minimum values and the elevation of the weapon varies to match the target range, means to selectively operate said source of energy when the trigger is actuated, and a graduated filter for said field stop for attenuating said energy, said filter being more attenuating in the region of said stop corresponding to the projection of said area at minimum target range than in the region corresponding to the projection of said area at maximum range.

3. A hit detector system in accordance with claim 2 wherein means are provided for indicating hits on said area when the weapon is aimed at said area and the elevation of said weapon is correct for the range of the target, said last named means comprising: indicator means responsive to a signal for indicating a hit on said area, and means for generating said signal only when the energy passing through said filter and detected by said detector lies within preestablished bounds.

4. A hit detector system comprising a target having a fixed area, a source of radiation on said area, a weapon whose angle of elevation is a function of target range, said weapon having an actuatable trigger, a telescope rigidly mounted on said weapon, a detector in said telescope responsive to said radiation for sensing the same when it is in the field of view of said telescope, means to cause said source to radiate when the trigger is actuated, and means to prevent said detector from sensing radiation from said source upon actuation of said trigger unless the elevation of the weapon is correct for the range of the target and the weapon is aimed at said area.

5. A hit detector system comprising a target having a fixed area defined by a boundary, a selectively operable radiant source on said target for radiating at a given wavelength, a weapon having an actuatable trigger, a telescope mounted on said weapon, a detector responsive to radiation at said given wavelength, said detector being placed in said telescope so that it produces an output when a source of radiation at said given wavelength is within the field of view of said telescope, a field stop screen having a field stop for limiting the field of view of said telescope, said field stop being the envelope of the projection of said boundary on said field stop as the target is moved from maximum to minimum ranges relative to said weapon, means to selectively operate said source when the trigger is actuated, and a filter on said field stop for attenuating radiation at said given wavelength, the transmissivity of said filter along a line on said field stop corresponding to the projection of a portion of said boundary when the target is at a particular range being inversely proportional to the intensity of radiation reaching said line from said target at said particular range.

6. A hit detector system in accordance with claim 5 including: selectively operable indicator means for indicating that the optical axis of the telescope is directed at said area when the trigger is actuated, and operable means responsive to the output of said detector for operating said indicator means.

7. A hit detector system in accordance with claim 6 wherein said detector produces an output of a certain level when said target is at maximum range and said telescope is directed at said area, and means are provided for preventing the output of said detector from being applied to said operable means if said output fails to exceed said certain level.

8. A hit detector system in accordance with claim 7 wherein means are provided for preventing the output of said detector from being applied to said operable means if the level of said output exceeds said certain level by a predetermined amount.

9. A hit detector system comprising a target having an area defined by a boundary, a selectively operable source on said target for radiating at a given wavelength, a weapon having an actuatable trigger, a telescope mounted on said weapon, a detector in said telescope responsive to radiation at said given wavelength for producing an output when a source of radiation at said given wavelength is within the field of view of said telescope, a field stop screen having a field stop for limiting the field of view of said telescope, said field stop being the envelope of the projection of said boundary on said field stop as the target range varies from maximum to minimum relative to the weapon, said field of view including said source when the optical axis of said telescope intersects said boundary at any target range, and means to selectively operate said source when the trigger is actuated.

10. A hit detector system comprising a target having a predetermined vulnerable area, a selectively operable source of radiant energy on said area, a weapon having an actuatable trigger, a photoelectric telescope rigidly mounted on said weapon and having detector means responsive to said energy, a field stop screen in said telescope, said screen having an aperture therein defining the envelope of the projection on said screen of said vulnerable area as the range of the target changes between minimum and maximum ranges, and means to selectively operate said source of energy when the trigger is actuated.

11. A hit detector system in accordance with claim 10 including: a graduated filter at said aperture for attenuating said energy, said filter being more attenuating in the region of said aperture corresponding to the projection of said area at minimum range than in the region corresponding to the projection of said area at maximum range.

12. A hit indicator system in accordance with claim 11 including: indicator means responsive to a signal for indicating a hit on said area, and means for generating said signal only when the energy passing through said filter and detected by said detector lies within pre-established bounds that are correlated with target range.

13. A hit detector system comprising a target having thereon a selectively operable source of radiant energy, a weapon having an actuatable trigger, a photoelectric telescope rigidly mounted on said weapon and having detector means responsive to said energy, means to selectively operate said source upon actuation of said trigger, and means for causing said detector means to produce an output only when the amount of energy reaching said detector means lies within preselected bounds 14. A hit detector system comprising a target having thereon a selectively operable source of radiant energy, a weapon having an actuatable trigger, means to operate said source upon actuation of said trigger, a photoelectric telescope rigidly mounted on said weapon and bore-sighted therewith, said telescope having detector means responsive to said energy for producing a signal when the intensity of energy reaching the detector exceeds a threshold limit, a field stop screen in said telescope, said screen having an aperture therein for limiting misalignment of the weapon with the source to a predetermined value within which energy exceeding said threshold limit will reach said detector when actuation of said trigger operates said source, and a graduated-density filter at said aperture for attenuating said energy, the density of said filter being graduated so that the magnitude of said value decreases as the range of the source increases.

15. A hit detector system comprising a target having a selectively operable source of radiant energy, a weapon having an actuatable trigger, means to operate said source upon actuation of said trigger, a photoelectric telescope rigidly mounted on said weapon and bore-sighted therewith, said telescope having detector means responsive to said energy for producing a signal when the intensity of energy reaching the detector exceeds a threshold limit, first means to limit misalignment of the weapon with the source to a predetermined value within which energy exceeding said threshold limit will reach said detector when actuation of said trigger operates said source, and second means to cause the magnitude of said predetermined value to decrease as the range of the source increases.

16. A hit indicator system comprising a circular target having at the center thereof a selectively operable source of radiant energy, a weapon having an actuatable trigger, means to operate said source upon actuation of said trigger, a photoelectric telescope rigidly mounted on said weapon nad bore-sighted therewith, said telescope having detector means responsive to said energy for producing a signal when the intensity of energy reaching the detector exceeds a threshold limit, a field stop screen in said telescope, said screen having therein a circular aperture of radius $r_0$, said aperture being the projection on the screen of said circular target when the latter is at a minimum range $R_1$, and a graduated density filter over said aperture, the density of said filter being given by:

$$d = \begin{cases} \left(\frac{R_2}{R_1}\right)^2 d_2 \left(\frac{r}{r_0}\right)^2 & \text{for } r_0' \leq r \leq r_0 \\ d_2 & \text{for } 0 \leq r \leq r_0' \end{cases}$$

where $R_1$ and $R_2$ are the minimum and maximum ranges of the target, $r_0'$ is the radius of the projection of the target on the screen when the target is at maximum range $R_2$, and $d_2$ is the density of the filter at $r=r_0'$, the density $d_2$ being such that the intensity of the radiant energy reaching the detector from the source when the latter is at maximum range is substantially equal to said threshold limit.

17. A hit detector system in accordance with claim 10 wherein said aperture is covered by a graduated density filter which causes the intensity of energy reaching said detector from said source when said trigger is operated and the weapon is pointed at the source to remain substantially constant as the target moves within preselected limits of range.

References Cited in the file of this patent

UNITED STATES PATENTS

| | | |
|---|---|---|
| 915,154 | Belin | Mar. 16, 1909 |
| 2,420,253 | Land | May 6, 1947 |
| 2,420,503 | Stechbart | May 13, 1947 |
| 2,442,240 | Hooker et al. | May 25, 1948 |
| 2,603,886 | Hodgson | July 22, 1952 |
| 2,719,366 | Schmitt | Oct. 4, 1955 |
| 2,891,437 | Tripp | June 23, 1959 |
| 2,927,212 | Shimukonis et al. | Mar. 1, 1960 |
| 2,933,317 | Pittinger et al. | Apr. 19, 1960 |
| 2,995,834 | Rowe | Aug. 15, 1960 |

FOREIGN PATENTS

| | | |
|---|---|---|
| 329,728 | France | Feb. 25, 1903 |